United States Patent [19]
Myerholtz

[11] 3,988,395

[45] Oct. 26, 1976

[54] METHOD FOR BLENDING POLYOLEFIN COMPOSITIONS

[75] Inventor: Ralph W. Myerholtz, Naperville, Ill.

[73] Assignee: Standard Oil Company (Indiana), Chicago, Ill.

[22] Filed: Sept. 22, 1975

[21] Appl. No.: 615,607

Related U.S. Application Data

[63] Continuation-in-part of Ser. No. 79,256, Oct. 8, 1970, abandoned.

[52] U.S. Cl. .............................. 260/897 A; 526/73; 526/104; 526/352
[51] Int. Cl.² ......................................... C08L 23/06
[58] Field of Search ................................ 260/897 A

[56]  References Cited
UNITED STATES PATENTS

| 3,176,051 | 3/1965 | Gregorian .......................... 260/878 |
| 3,179,720 | 4/1965 | Hilmer ............................... 260/897 |

Primary Examiner—Carman J. Seccuro
Attorney, Agent, or Firm—Wallace L. Oliver; Arthur G. Gilkes; William T. McClain

[57]  ABSTRACT

High density polyolefin blends having good rheological properties are formed by combining low molecular weight polymers with high molecular weight polymers using a specified blending method.

11 Claims, 1 Drawing Figure

METHOD FOR BLENDING POLYOLEFIN COMPOSITIONS

BACKGROUND OF THE INVENTION

This is a continuation-in-part of application Ser. No. 79,256 filed Oct. 8, 1970, now abandoned.

This invention relates to blends of high density polyethylene produced by molybdenum oxide catalyst and more specifically relates to a method of choosing the components of the blend to form a composition having superior rheological properties.

In non-molybdenum oxide polymerized polyolefins, the art broadly discloses blending polymers of a high melt index [M.I.] (low inherent viscosity [I.V.]) with polymers of low melt index (high I.V.). Such broad teaching is found in Gregorian et al. U.S. Pat. No. 3,176,051 and Hilmer, U.S. Pat. No. 3,179,720.

SUMMARY OF THE INVENTION

My invention is a method for blending polyolefins with up to four polymeric components, each formed from ethylene or a mixture of ethylene and a lower mono-olefin polymerized at about 230° to 300° C. in a suitable liquid hydrocarbon medium in contact with an effective amount of a molybdenum oxide catalyst supported on gamma-alumina, wherein at least a low molecular weight component having a melt index of about 3.0 to 10.0 and at least a high molecular weight component having an inherent viscosity of about 3.0 to 7.0 are blended such that the melt index of the blend is about 0.1 to 1.8 and wherein the weight percent of the high molecular weight component is chosen substantially as specified by the Blending Curve shown in the FIGURE.

DESCRIPTION OF THE DRAWING

The Figure shows the functional relationship between the weight percent of high molecular weight component versus the inherent viscosity of that component in Applicant's blends. This relationship is labeled "Applicant's Blending Curve". Similar type data derived (I.V. calculated from R.S.V.) from the Examples in Hilmer (excluding Hilmer Example 7) are presented to contrast Applicant's teaching of a specific blending method.

DESCRIPTION OF THE INVENTION

Figure 1:
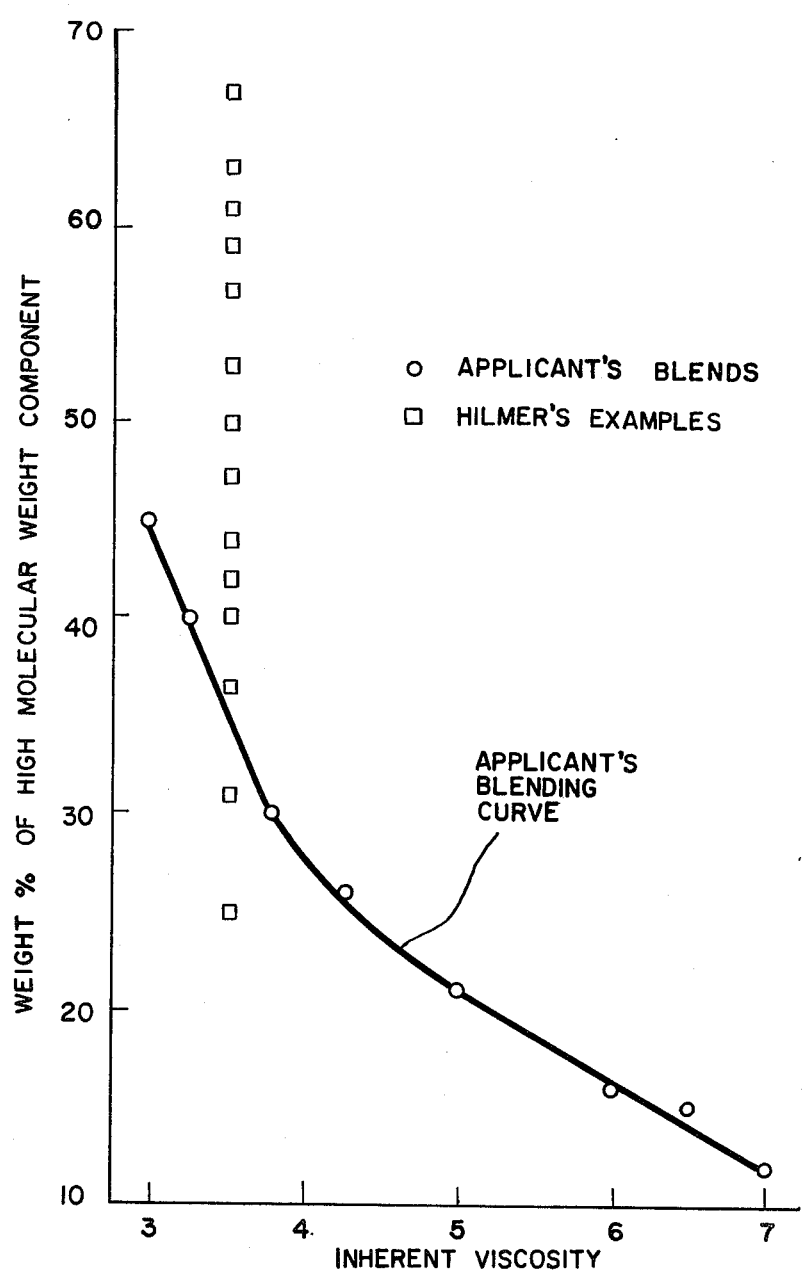

Briefly, the blended polyolefins of my invention consist essentially of at least two and up to and including four polymeric components which differ in their molecular weight and which are present in relative amounts such that the total composition has a melt index of about 0.1 to about 1.8. At least one of the components has a melt index of between about 3.0 to about 10.0. At least one other of the component has an inherent viscosity of between about 3.0 to 7.0. All other components (i.e. for 3- or 4-component compositions) are characterized by having values within either of the above ranges. Each component can be characterized by describing it as the product of a process, namely, the polymerization of a mono-olefin or mixtures of contact with a specific catalyst system in the presence or absence of a promoter under heat and pressure in a suitable liquid medium. While my compositions include components in excess of two, for clarity and ease of description, I will describe my invention in terms of its preferred embodiment — a two-component composition.

The blends formed by this invention possess a particularly good balance of rheological properties under blow molding and extrusion conditions. For extrusion and blow molding operations it is desirable to have a high shear rate for oscillating flow (SROF), a low melt viscosity, a high shear rate for onset of melt fracture, a matte to fine matte surface appearance at shear rates between about 75 sec.$^{-1}$ and SROF, and a smooth extrudate region between the cessation of oscillating flow and onset of melt fracture.

Polyolefins heretofore made by processes broadly similar to the present one and whose molecular weight distributions were narrower than those of the present blended compositions exhibit four regions of shear rate, each set-off from the others by distinctly different flow phenomena. First, at low shear rates starting at about 75 sec. $^{-1}$ (hereinafter referred to as the sub-oscillation region), a pronounced surface defect referred to as "sharkskin" appears, which is characterized by relatively deep indentations bracketed by sharply defined ridges occurring at closely-spaced and regular intervals along the extrudate. The second region following the "sharkskin" range exhibits oscillating flow wherein the recorded load on the rheometer oscillates between two values producing alternating sections of extrudate with varying diameters. Unacceptable extrudates are made in this region. Following this is a third region (hereinafter referred to as the post-oscillation region) wherein a very smooth extrudate is produced. Finally a fourth region is reached at the highest shear rates wherein the phenomenon known as "melt fracture" occurs, which is represented by a severely distorted extrudate.

When the blended compositions of my invention are subjected to the above ranges of shearing forces, they respond most unexpectedly. First, sharkskin is eliminated and the surface of their extrudates is either completely smooth or at worst only minutely affected in that the gloss of the surface is reduced to what I refer to as a "matte" appearance. Second, the post-oscillation region wherein smooth flow is exhibited is broadened considerably permitting a wide range of extrusion conditions. Third, in most cases the onset of melt fracture is delayed, permitting high throughput operations in regions previously unusable because of this severe phenomenon. Another useful property of my composition is their low apparent viscosity under shear, which enhances their processability.

My blended compositions have a melt index (M.I.) of about 0.1 to about 1.8 and preferably about 0.2 to 1.0. All melt indexes referred to herein were determined using ASTM test No. D-1238, procedure E wherein the test is conducted at 190° C. under a total load of 2160 grams.

The first (low molecular weight) component (also referred to as "fraction") of my polyolefin blended compositions has an M.I. value of about 3.0 to 10.0, preferably about 4.0 to 9.0. The second component, possessing relatively high molecular weight species, is most suitably characterized by its inherent viscosity (I.V.). The inherent viscosity of this second fraction may vary from about 3.0 to 7.0. These values are those measured at a concentration of 0.1 g./100 ml. of purified and stabilized decalin at 135° C.

The relative proportions of the two components necessary to produce any desired final composition are fixed by the well-established relationship that:

$$[I.V.] \text{ (total)} = W_1 [I.V.]_1 + W_2 [I.V.]_2 \quad \text{(Eq. 1)}$$

where W is the weight fraction of each polymeric fraction and $[I.V.]_1$ and $[I.V.]_2$ are the inherent viscosities of each component.

A selection of the two specific components to be used and the desired final melt index of the product permits Equation 1 to be solved simultaneously together with the known relationship that the two weight fractions total 1.0. It is to be noted that selecting a final inherent viscosity is, in effect, selecting a final M.A., since I have empirically proven for products from this process the following relationship exists $$\log [M.I.] = -5.03 \log [I.V.] + 1.2840 \quad \text{(Eq. 2)}$$

Thus final inherent viscosities corresponding to my M.I. limits of 0.1 to 1.8 can be computed. Typical second components are, for example, 45% of I.V. at 3.0 down to 12% of I.V. at 7.0. Preferred compositions are illustrated by compositions of 40% of I.V. at 3.3 down to 15% of I.V. at 6.5.

Rheological and other physical properties of high density polyethylenes (HDPE's) depend, in part, on inherent molecular weight distributions, degree of branching and location of unsaturation within the polymer, all of which, in turn, depend on the method of polymerization. Such a combination of properties gives to a HDPE a unique character which is not described fully by gross measurements such as M.I., I.V. or density alone. However, one indication of inherent molecular weight distributions and/or structure is the functional relation between log [M.I.] vs. log [I.V.] of a given HDPE. As stated above, I have empirically found that for an unblended molybdenum oxide polymerized HDPE this relation is given in Equation 2. If a log-log plot is made of similar data in the Hilmer patent, a clearly different relation is found for Ziegler-type polymerized HDPE. Thus, the unblended polyethylenes used in my invention are materially distinct from the Ziegler-type polymerized products.

Although the art discloses blending relatively low M.I. (high I.V.) with high M.I. (low I.V.) polyolefin components in non-molybdenum oxide polymerized systems, I have found that in molybdenum oxide catalyzed HDPE's only blends using a proportion of high I.V. component specified by its specific I.V. value yield compositions with suitable rheological properties. This functional relationship substantially is shown as the "Blending Curve" presented in the Figure.

The two components of which my blended compositions essentially consist are polymerized from their monomeric mono-olefinic feeds by a specific process, which I will now describe in detail. Suitable olefins are the normally gaseous, lower 1-alkenes such as ethylene, propylene, 1-butene and mixtures thereof. Relative proportions are selected to give final copolymer products whose minimum unannealed densities are about 0.92 g./cc. The catalyst system used for making the individual polymeric components is a supported transition metal oxide, specifically molybdenum oxide on a gamma-alumina support having a surface area greater than 100 m²/gm. While such a catalyst shows some polymerization activity when the molybdenum is in the maximum valence state and in an unpromoted system, the preferred technique is to partially reduce a molybdic oxide component prior to carrying out the polymerization and carrying out the reaction in the presence of suitable co-catalysts or promoters.

The reducing treatment suitably is effected with hydrogen at temperatures between 350° C and about 850° C, although it is more often employed at temperatures within the range of 400°–500° C at atmospheric pressure. While metals, metal hydrides, and metal alkyls of Groups I, II, and III of the periodic chart are known to act individually or in combinations as promotors and/or co-catalyst for the particular transition metal catalysts, the preferred co-catalyst is sodium metal which results in higher yields of solid polymers under our typical reaction conditions. The useful range of sodium is between about 0.01 and 2 parts by weight per part by weight of molybdenum catalyst at ratios between about 5 and about 3000 volumes of liquid medium per part by weight of metal oxide catalyst.

The molybdena may be incorporated in the catalyst in any known manner, e.g., by impregnation, co-precipitation, co-gelling, etc. The usual metal oxide-support ratios are in the range of 1:20 to 1:1. Preferably we employ a conditioned alumina-metal oxide catalyst composed of about 20% molybdenum oxide supported on a gamma-alumina base. The catalysts can be employed in various forms and sizes, e.g., as powder, granules, microspheres, broken filter cake, lumps, or shaped pellets. A convenient form in which the catalysts may be employed is as microspheres with average particle dimensions in the range of 60 to 90 microns.

The polyolefins useful in my invention are formed in the presence of a solvent, such as the various classes of hydrocarbons or their mixtures which are liquid and substantially inert under the polymerization reaction conditions. Suitable solvents are aromatic hydrocarbons, particularly the mononuclear aromatic hydrocarbons such as benzene, toluene, the xylenes, mesitylene and xylene-p-cumene mixtures. Other useful aromatic hydrocarbons are ethylbenzene, isopropyl benzene, n-propyl benzene, t-butyl benzene, ethyltoluenes, ethylxylenes, hemimellitene, pseudocumene, prehnitene, isodurene, diethyl benzenes, tetrahydronaphthalene and the like. Suitable aromatic hydrocarbon fractions can be obtained by the selective extraction of aromatic naphthas from hydroforming operations as distillates or bottoms from cycle stock fractions of cracking operations, etc.

Certain alkyl naphthalenes which are liquid under the polymerization reaction conditions, such as 1-methylnaphthalene, 2-isopropylnaphthalene, 1-n-amyl-naphthalene and the like, or commercially produced fractions containing these hydrocarbons, are useful. Certain classes of aliphatic hydrocarbons also can be employed as a liquid hydrocarbon reaction medium in the present process. Thus, I may employ various saturated hydrocarbons (alkanes and cycloalkanes) which are liquid under the reaction conditions. Either pure alkanes or cycloalkanes or commercially available mixtures, freed of catalyst poisons, may be employed. For example, I may employ straight-run naphthas or kerosenes containing alkanes and cycloalkanes. Specifically, I can use liquid or liquefied alkanes such as n-hexane, 2,3-dimethylbutane, n-octane, iso-octane (2,2,4-trimethylpentane), n-decane, n-dodecane, cyclohexane, methylcyclohexane, dimethylcyclopentane, ethylcyclohexane, decalin, methyldecalins, dimethyldecalins and the like. A particularly suitable class of solvents are those $C_{10}$–$C_{12}$ aliphatic hydrocarbons boiling in the range of about 170° C. – 250° C. One particularly suitable solvent from this class is called odorless mineral spirits (OMS).

The liquid hydrocarbon reaction medium should be freed of poisons, for example, by percolation over alumina or silica, by acid treatment with anhydrous p-toluene sulfonic acid, sulfuric acid, or by equivalent treatments, such as with aluminum halides or other Friedel-Crafts catalysts, maleic anhydride, calcium, calcium hydride, sodium, or other alkali metals, alkali metal hydrides, lithium aluminum hydride, hydrogen and hydrogenation catalysts (Hydro-fining), filtration through a column of copper granules or Group VIII metal, etc., or by combinations of such treatments.

The process of the present invention can be effected to some extent at ordinary atmospheric pressure. The upper limit of the partial pressure of the monomer undergoing polymerization in my process is dictated by economic considerations and equipment limitations and can be up to 20,000 p.s.i.g. or even more. A generally useful and economically desirable pressure range when ethylene is being polymerized is a pressure between about 200 and about 5000 p.s.i.g., preferably between about 500 and 1500 p.s.i.g., and, typically, about 850–1200 p.s.i.g. This latter range is typically used since above about 850 p.s.i.g., pressure no longer has a significant effect on M.I.

A clear understanding of how temperatures may be variously employed to produce my compositions requires first a discussion of the options available in making the components of my polyolefins. First, each component may be made separately employing a single temperature for the polymerization, such method referred to as single-temperature operation (STO). Thus, for example, two components, one with an M.I. of 5.0 and the other with an I.V. of 3.0 can be separately made using appropriate single temperatures. The two components, usually in solid form, then can be blended into a final composition of this invention by any convenient means known to the art and discussed in greater detail below.

As an alternative, both components may be made consecutively in a series of reactors or a single reactor with two zones of temperature sharply demarcated. Temperature programming in my dual-temperature operation (DTO) is always carried out in a descending order, i.e., — the first temperature is high and the second low. Sharp temperature demarcation is important. For example, runs made in a single-zoned reactor wherein the reactor contents were gradually cooled to achieve the lower temperature produced a spectrum of molecular species whose composite possess very poor rheological properties.

Whether DTO or STO is employed, temperatures useful in my process range from about 230° C to 300° C. The exact temperature varies slightly, within the broad range given, of course, as other parameters, such as catalyst activity, feed composition etc., change. For example, a component with an I.V. of 1.25 was made with a lower-activity catalyst at 277° – 280° C., while a higher-activity catalyst such as a chloride catalyst as disclosed in Shepard et al. U.S. Pat. No. 3,530,077 required a new temperature of about 292° C. to achieve the same inherent viscosity. Another well-known trend is the need to reduce reaction temperature to make a given M.I. when conducting copolymerization. It is fundamental to the art that M.I. bears a direct proportional and inherent viscosity bears an inverse proportional relationship to the polymerization temperature.

It is well within the skill of the art and a simple matter to determine for any set of reaction parameters, the temperature necessary to produce a certain M.I. product. Thus, specific components within the ranges for the low molecular weight component or high molecular weight component can be made easily.

The contact time or space velocity employed in the polymerization process is selected with reference to the other process variables, catalysts, the specific type of product desired and the extent of ethylene conversion desired in any given run or pass over the catalyst. In general, this variable is readily adjustable to obtain the desired results. In operations in which the ethylene charging stock is caused to flow continuously into and out of contact with the solid catalyst, suitable liquid hourly space velocities usually are between about 0.1 and about 10 volumes, preferably about 0.5 to 5 or about 2 volumes of ethylene solution in the liquid reaction medium. The amount of ethylene in such solutions may be in the range of about 2 to 50 weight percent, preferably about 2 to about 10 weight percent or, for example, about 5 to 10 weight percent. It has been observed that when the ethylene concentration in the liquid reaction medium is decreased below about 2 weight percent, the molecular weight and melt viscosity of the polymeric products drop sharply. The rate of ethylene polymerization tends to increase with increasing concentration of the ethylene in the liquid reaction medium. However, the rate of ethylene polymerization to form high molecular weight, normally solid polymers must not be such as to yield said polymers in quantities which substantially exceed the solubility thereof in said liquid reaction medium under the reaction conditions. Typically, concentrations vary from about 10 to 30 percent, depending on M.I.

In batch operations, the reaction autoclave is charged with ethylene as the pressure falls as a result of the ethylene conversion reaction, while operating periods in such operations typically are between about one-half and about 10 hours and usually between about 1 and about 4 hours.

Product recovery is not critical to my compositions and any of the techniques known to the art are suitable. Typically, raw polymer solution is filtered to remove catalyst, precipitated, washed, and, optionally, very low molecular weight grease-like ethylene polymers extracted with a solvent such as hexane.

Where The STO method has been employed, the two components must be combined in a separate step. This can be done in any number of ways practiced heretofore by the art, such as hot-roll blending, solution blending and high-shear mixing with extruders, etc. Temperature should be controlled to avoid degrading the product. For example, hot-roll blending at about 160° C to 170° C. has been useful.

I have found that hot-roll blending becomes less convenient where one of the components has an inherent viscosity in excess of about 4.0, while solution blending is suitable for all components regardless of their molecular weights. In solution blending, the polyolefin components are dissolved in an agitated vessel at suitably low temperatures, e.g., 160° C to 200° C. After the resulting uniformly dissolved and mixed blend is precipitated by cooling and adding it to anti-solvents such as methanol, isopropanol, acetone, ect., washing and drying complete the procedure.

The nature and advantages of my blended compositions will be further explained by a study of the Examples and comparative runs given below. These examples are, of course, demonstrative only and in no sense should they be construed as limiting the scope of my invention to their exact details.

In Table I, Examples of my blended compositions are numbered whereas runs outside the scope of my invention are lettered. The blended compositions have as their second, low-molecular weight component an STO-prepared polyethylene with an I.V. of 1.25 (M.I. of 5.0). Since comparisons should be made at approximately equal M.I., I have arranged examples in order of increasing M.I., except that for continuity I have split the numbered examples into two source groups — physical blends and DTO-prepared blended compositions.

The data in Tables I, II and III were gathered using the following conditions and procedures:

As Instron capillary rheometer was used for all measurements except as noted. The Instron tester was equipped with a push-button crosshead speed selector for rapid election of shear rate, while an Instron variable speed drive accessory was used to obtain shear rates other than those provided by the push-button selector. All measurements on this instrument reported here were made at 190° C, using tungsten carbide capillaries with the following nominal dimensions unless otherwise specified:

> Diameter = 0.050 inch
> Length = 2.00 inch
> Entrance angle = 90 degrees (included angle)

With these dimensions, a shear rate range of 3 to 3,000 sec.$^{-1}$ could be covered. Calculations of shear stress, shear rate, and apparent viscosity were as outlined in the manuals provided with the rheometer. Since only comparative measurements were needed, no corrections were made for kinetic energy or entrance effects, although the high length-to-diameter ratio of the capillary minimizes any such corrections.

To make a run, after the rheometer temperature was allowed to stabilize for at least an hour prior to charging the sample, about 13 grams of sample was charged, the plunger re-inserted, and at least 10 minutes allowed to assure temperature equilibrium before starting measurements. Although samples in pellet form provided no handling problem, fine powders or finely ground samples (e.g. 20 mesh) tended to stick to the walls of the chamber and caused charging problems leading to trapped air. Such powdered samples first were molded into 75 mil thick sheets which were then chopped into small pieces with a shear to facilitate loading. A total of three loadings usually was required to obtain all desired data.

Measurements were first made at the ten fixed speeds of 0.02 to 20 inches/minute crosshead travel. The variable speed drive accessory then was switched in and such intermediate speeds were used as desired. This accessory was also used in determining the shear rate for the onset and cessation of oscillating flow. The plunger motion was started and the drive speed was gradually and continuously increased until an oscillating load was shown on the force recorder and this speed was used to calculate the shear rate for oscillating flow. Replicate measurements indicated a precision of about ± 5% for this measurement.

Samples of the extrudate at each shear rate were saved and mounted. These were then examined at 20 magnification with a stereo microscope to rate the surface appearance and measure strand diameter. The ratio of strand diameter to capillary diameter was taken as the swelling ratio. Photographs of extrudates were taken after they had been rubbed with a wax crayon and the excess removed, to make surface details more clearly visible. Photographs were made for extrudates obtained at several shear rates for most samples.

Flow curves of my compositions were distinctly different from other compositions run. By flow curve, I mean a plot of log [apparent viscosity] vs. log [shear rate], where "apparent viscosity" is the term I use to express the viscosity of a sample at any given shear stress-shear rate condition. Various terms related to these flow curves appearing in Tables I, II and III are:

TABLE I

| Example (Run) | M.I. | Preparative Method[1] | G.P.C. Data | | | |
|---|---|---|---|---|---|---|
| | | | $\bar{M}w \times 10^{-3}$ | $\bar{M}n \times 10^{-3}$ | $\bar{M}z \times 10^{-6}$ | $\bar{M}w/\bar{M}n$ |
| (A) | 0.43 | STO | — | — | — | — |
| (B) | 0.50 | STO | 151 | 11.3 | 0.63 | 13.4 |
| (C) | 0.71 | STO | — | — | — | — |
| (D) | 0.74 | PTO (64)[2] | — | — | — | — |
| (E) | 0.98 | STO | — | — | — | — |
| (F) | 1.30 | PTO (64)[3] | — | — | — | — |
| (G) | 0.45 | Blend[4] | — | — | — | — |
| 1 | 0.34 | DTO (50) | 180 | 11.4 | 1.06 | 15.7 |
| 2 | 0.38 | DTO (35) | 172 | 13.0 | 0.87 | 13.2 |
| 3 | 0.49 | DTO (36) | 143 | 7.6 | 0.78 | 18.7 |
| 4 | 0.55 | DTO (37) | 138 | 7.6 | 0.82 | 18.2 |
| 5 | 0.60 | DTO (37) | 173 | 7.5 | 1.08 | 23.2 |
| 6 | 0.74 | DTO (40) | 159 | 10.1 | 1.10 | 15.7 |
| 7 | 1.00 | DTO (20–25) | — | — | — | — |
| 8 | 0.48 | Blend[5] | 149 | 8.1 | 0.74 | 18.3 |
| 9 | 0.39 | Blend[6] | 152 | 9.4 | 0.74 | 16.2 |
| 10 | 0.45 | Blend[7] | 158 | 9.0 | 0.83 | 17.4 |
| 11 | 0.49 | Blend[8] | 167 | 8.7 | 1.05 | 19.2 |
| 12 | 0.52 | Blend[9] | 164 | 9.9 | 1.18 | 16.4 |
| 13[10] | 0.33 | DTO (50) | — | — | — | — |
| 14[10] | 0.31 | DTO (55) | — | — | — | — |

TABLE I-continued

| Example (Run) | M.I. | Preparative Method[1] | G.P.C. Data | | | |
|---|---|---|---|---|---|---|
| | | | Mw × 10$^{-3}$ | Mn × 10$^{-3}$ | Mz × 10$^{-6}$ | Mw/Mn |
| 15 | 0.57 | DTO (35) | — | — | — | — |

[1]STO = Single Temperature Operation.DTO = Double Temperature Operation; Temperature differential (°C.) in parentheses.PTO = Poly Temperature Operation where product polymerized in an un-staged reactor and then cooled gradually to a second temperature.Blend--formed by solution blending.
[2]Descending temperatures used.
[3]Ascending temperatures used.
[4]Blend contains 5 wt. % of HDPE having I.V. of 18.0.
[5]Blend contains 40 wt. % of HDPE having I.V. of 3.3.
[6]Blend contains 30 wt. % of HDPE having I.V. of 3.8.
[7]Blend contains 26 wt. % of HDPE having I.V. of 4.3.
[8]Blend contains 21 wt. % of HDPE having I.V. of 5.0.
[9]Blend contains 16 wt. % of HDPE having I.V. of 6.0.
[10]Ethylene-propylene copolymer.

TABLE II

| Example (Run) | $N_A$ (× 10$^4$ poise) | S.R.O.F. (sec$^{-1}$) Start | S.R.O.F. (sec$^{-1}$) Stop | $M_1$ | $M_2$ | $M_2/M_1$ | S.I. | $SR_{100}$ | From 75/sec. to SROF | Extrudate Appearance Post-Oscillation Flow Smooth Range | Extrudate Appearance Shear Rate for Melt Fracture Onset (sec.$^{-1}$) |
|---|---|---|---|---|---|---|---|---|---|---|---|
| (A) | 7.8 | 470 | 820 | −0.38 | −0.70 | 1.8 | 40 | 1.3 | Sharkskin | 900–1,500 | ~2,200 |
| (B) | 8.0 | 540 | 740–890 | −0.42 | −0.68 | 1.6 | 46 | 1.3 | Sharkskin | 1,200–1,700 | ~1,800 |
| (C) | 7.0 | 450 | 790 | −0.38 | −0.62 | 1.6 | 40 | — | Heavy Matte | 800–2,500 | ~2,500 |
| (D) 1, 2 | — | — | — | — | — | — | — | — | Sharkskin | | |
| (E) | 5.6 | 630 | 940 | −0.34 | −0.62 | 1.8 | 42 | 1.4 | Heavy Matte to Sharkskin | 950–3,000 | ~3,000 |
| (F) 1, 3 | — | — | — | — | — | — | — | — | Sharkskin | | |
| (G) 4 | 4.1 | — | — | −0.41 | −0.59 | 1.4 | 60 | 2.0 | Matte | | |
| 1 | 7.7 | 460 | 930 | −0.48 | −0.63 | 1.4 | 44 | 1.4 | F. Matte-Matte | 950–1,800 | ~2,200 |
| 2 | 8.3 | 370 | 820 | −0.50 | −0.62 | 1.2 | 33 | 1.4 | Matte | 850–1,700 | ~1,800 |
| 3 | 6.0 | 830 | 1240 | −0.44 | −0.62 | 1.4 | 45 | 1.4 | Matte | 1,250–2,200 | ~3,000 |
| 4 | 5.4 | 1100 | 1500 | −0.42 | −0.62 | 1.6 | 40 | 1.4 | Matte | 1,800–2,200 | ~3,000 |
| 5 | 6.1 | 890 | 1250 | −0.43 | −0.63 | 1.5 | 45 | 1.4 | Matte | 1,300–2,200 | ~3,000 |
| 6 | 5.4 | 1020 | 1270 | −0.45 | −0.61 | 1.4 | 51 | 1.4 | F. Matte-Matte | 1,300–3,000 | ~3,000 |
| 7 | 5.4 | 790 | 1110 | −0.38 | −0.63 | 1.7 | 51 | 1.4 | Matte | 1,200–3,000 | — |
| 8 | 6.9 | 800 | 1040–1190 | −0.46 | −0.66 | 1.4 | 42 | 1.4 | Semi Matte | 1,200–1,400 | ~1,500 |
| 9 | 7.3 | 680 | 890–1040 | −0.46 | −0.66 | 1.4 | 36 | 1.3 | Matte | 1,050–1,500 | ~2,200 |
| 10 | 6.8 | 780 | 1040–1190 | −0.45 | −0.64 | 1.4 | 29 | 1.4 | Matte | 1,200–1,500 | ~2,500 |
| 11 | 6.3 | 800 | 1040–1190 | −0.46 | −0.66 | 1.4 | 39 | 1.4 | Fine Matte | 1,200–1,800 | ~2,500–3,000 |
| 12 | 4.1 | — | — | −0.41 | −0.63 | 1.4 | 42 | 1.5 | Fine Matte | 1,200–2,200 | ~2,500–3,000 |
| 13 | 6.9 | 640 | 910 | −0.51 | −0.63 | 1.2 | 50 | 1.3 | F. Matte-Matte | 920–1,500 | 1,500 |
| 14 | 6.6 | 750 | 970 | −0.52 | −0.60 | 1.2 | 54 | 1.4 | Fine Matte | 1,000–2,200 | 2,800 |
| 15 | 6.5 | 750 | 960 | −0.46 | −0.63 | 1.4 | 55 | 1.4 | F. Matte-Matte | 1,000–1,500 | 2,800 |

1 Rheological data obtained on C.I.L. gas pressure operated rheometer at 218° C. with a capillary diameter of 0.49 mm and length of 4.47 mm.
2 Extrudate surface distortion appeared at 1 sec.$^{-1}$.
3 Extrudate surface distortion appeared at 286 sec.$^{-1}$.
4 No oscillating flow up to 3000 sec.$^{-1}$, but obtained crooked extrudites above 500–600 sec.$^{-1}$.

$N_A$ — The apparent viscosity (poise) at 5 sec$^{-1}$ read from the flow curve.
$M_1$ — The slope in the region of 3–15 sec$^{-1}$
$M_2$ — The slope in the region of 100–1,000 sec$^{-1}$
$M_2M_1$ — Ratio of the above slopes
S.I. (Slope Intercept) — Shear rate (/sec) where the lines of slope $M_1$ and $M_2$ intersect All my blended compositions when analyzed fell within the ranges of values stated in Table III.

TABLE III

| Parameter | | |
|---|---|---|
| M.I. | 0.2 to 0.9 | 0.9 to 1.8 |
| $N_A$ (poise) | 5.0×10$^4$ to 9.5×10$^4$ | 3.0×10$^4$ to 6.0×10$^4$ |
| Shear Rate at Onset of Oscillating Flow (SROF) (1/sec) | 350 to 1,400 | 900 to 2,500 |
| $M_1$ | −0.30 to −0.48 | −0.25 to −0.38 |
| $M_2$ | −0.60 to −0.72 | −0.52 to −0.62 |
| $M_2/M_1$ | 1.3 to 2.2 | 1.6 to 2.0 |
| S.I. (1/sec) | 20 to 68 | 30 to 55 |

Gel permeation chromotographical data was obtained using a Waters Model 200. A linear polyethylene sample previously characterized by the National Bureau of Standards was used to establish a calibration curve for the measurements.

To demonstrate that for molybdenum oxide polymerized HDPE the prior art disclosure does not produce suitable polymeric compositions, a series of blends were made (by mill blending) generally using the teaching of the Hilmer examples. The results are shown in Table IV. The rheological advantage of my blended compositions are apparent in that the post oscillation flow is much broader and the shear rate for onset of melt fracture is greater in blends of my invention than in blends outside the invention. This advantage allows a greater throughput rate which provides a more efficient overall process.

TABLE IV

| Run | Blend M.I. | SROF (sec$^{-1}$) Start | SROF (sec$^{-1}$) Stop | Shear Rate for onset of Melt Fracture | $N_A$ (×10$^4$poise) | Surface Appearance from 75 sec$^{-1}$ to SROF | Post-Oscillating Flow Range (sec$^{-1}$) | I.V. (wt. %) of high molecular weight component | M.I. (wt. %) of low molecular weight component |
|---|---|---|---|---|---|---|---|---|---|
| H | 0.12 | 120 | 470 | ca 470 | 13.7 | Matte | None | 3.7 (61) | 5.5 (39) |
| I | 0.13 | 320 | 700 | ca 1700 | 10.8 | Matte | None | 4.6 (26) | 4.7 (74) |
| J | 0.15 | 140 | 700 | ca 700 | 13.0 | Matte | None | 3.5 (67) | 9.3 (33) |
| K | 0.48 | 800 | 1040–1190 | ca 1700 | 6.9 | Sharkskin to semi-Matte | 1100 to 1700 but extrudate was twisted | 3.3 (40) | 5.0 (60) |
| L | 0.57 | 250 | 710 | ca 710 | 10.0 | Heavy Matte | None | 2.7 (61) | 5.5 (39) |

Table V demonstrates the improved rheological properties typical of my compositions under blow-molding conditions. All settings and conditions were the same for the tabulated experiments. Mold temperature was controlled between 75°–95° F. and melt temperature was held at about 370° F. Shear rates (in reciprocal seconds) at any given pressure vary between samples due to differences in melt viscosity and die-swell behavior. As a guide, these ranges are: for free extrusion (F.E.), 200–500; for 800 p.s.i.g., 600–1600; for 1200 p.s.i.g., 1100–2900; and for 1500 p.s.i.g., 1200–3300. Samples are those previously identified in Table I.

The performance was rated by observing the interior surface of each bottle and assigning a rating of from 0 to 13 based on visual standards. A rating of 0 is "very smooth", while 13 is "very rough".

TABLE V

| Example (Run) | $\Delta T$(° C.) | F.E. | Pressure (p.s.i.g.) 800 | 1200 | 1500 |
|---|---|---|---|---|---|
| (B) | 0 | 12 | 11 | 1 | 1 |
| 4 | 37 | 0 | 0 | 1 | 10 |
| 5 | 37 | 0 | 0 | 1 | 11 |

By using the method of my invention molybdenum oxide polymerized polyolefin components can be blended to form compositions with superior rheological properties and especially suited for extrusion and blow-molding applications.

I claim:

1. A method for blending polyolefins with up to four polymeric components, each formed from ethylene or a mixture of ethylene and a lower mono-olefin polymerized at about 230° to 300° C. in a suitable liquid hydrocarbon medium in contact with an effective amount of molybdenum oxide catalyst supported on gamma-alumina, wherein at least a low molecular weight component having a melt index of about 3.0 to 10.0 and at least a high molecular weight component having an inherent viscosity of about 3.0 to 7.0 are blended such that the melt index of the blend is about 0.1 to 1.8 and wherein for a given inherent viscosity of the high molecular weight component the weight percent of the high molecular weight component is the corresponding value on the Blending Curve shown in the Figure.

2. The method of claim 1 wherein the low molecular weight component has a melt index ranging from about 4.0 to 9.0 and the high molecular weight component has an inherent viscosity ranging from about 3.3 to 6.5.

3. The method of claim 2 wherein the blend contains two polymeric components.

4. The method of claim 3 wherein each polymeric component is a high density polyethylene homopolymer.

5. The method claim 2 wherein the melt index of the blend ranges from about 0.2 to 1.0.

6. The method of claim 4 wherein the melt index of the blend ranges from about 0.2 to 1.0.

7. The method of claim 6 wherein the blend contains about 40 weight percent of a high molecular weight component having an inherent viscosity of about 3.3.

8. The method of claim 6 wherein the blend contains about 30 weight percent of a high molecular weight component having an inherent viscosity of about 3.8.

9. The method of claim 6 wherein the blend contains about 26 weight percent of a high molecular weight component having an inherent viscosity of about 4.3.

10. The method of claim 6 wherein the blend contains about 21 weight percent of a high molecular weight component having an inherent viscosity of about 5.0.

11. The method of claim 6 wherein the blend contains about 16 weight percent of a high molecular weight component having an inherent viscosity of about 6.0.

* * * * *

UNITED STATES PATENT OFFICE
CERTIFICATE OF CORRECTION

Patent No. 3,988,395          Dated October 26, 1976

Inventor(s) Myerholtz, Ralph W.

It is certified that error appears in the above-identified patent and that said Letters Patent are hereby corrected as shown below:

Column 1, line 55   "component" should be -- components

"   1   "   61   "mixtures of contact" should be -- mixtures thereof by contact

"   3   "   1   "$W_1[i.v.]_1 + W_2[i.v.]_2$" should be -- $W_1[I.V.]_1 + W_2[I.V.]_2$ "   3   "   11   "M.A." should be -- M.I.

"   7   "   18   "As Instron" should be -- An Instron

"   9   "   52   "$M_2M_1$" should be -- $M_2/M_1$

"   9   "   53   "(/sec)" should be -- (1/sec)

Signed and Sealed this

Fourth Day of January 1977

[SEAL]

Attest:

RUTH C. MASON
*Attesting Officer*

C. MARSHALL DANN
*Commissioner of Patents and Trademarks*